United States Patent
Mukherjee et al.

(10) Patent No.: US 9,358,613 B2
(45) Date of Patent: Jun. 7, 2016

(54) HYDROPHOBIC POROUS HARD COATING WITH LUBRICANT, METHOD FOR MAKING AND USE OF SAME

(71) Applicants: Somesh Kumar Mukherjee, Spring, TX (US); Vivekanand Sista, The Woodlands, TX (US); John H. Stevens, The Woodlands, TX (US)

(72) Inventors: Somesh Kumar Mukherjee, Spring, TX (US); Vivekanand Sista, The Woodlands, TX (US); John H. Stevens, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 122 days.

(21) Appl. No.: 13/858,250

(22) Filed: Apr. 8, 2013

(65) Prior Publication Data
US 2014/0302305 A1 Oct. 9, 2014

(51) Int. Cl.
| | |
|---|---|
| *B32B 5/18* | (2006.01) |
| *B22F 7/00* | (2006.01) |
| *C22C 1/04* | (2006.01) |
| *C22C 1/08* | (2006.01) |
| *C23C 30/00* | (2006.01) |
| *B22F 5/00* | (2006.01) |

(52) U.S. Cl.
CPC ............... *B22F 7/004* (2013.01); *C22C 1/045* (2013.01); *C22C 1/08* (2013.01); *C23C 30/00* (2013.01); *B22F 2005/001* (2013.01); *Y10T 428/249956* (2015.04); *Y10T 428/249957* (2015.04); *Y10T 428/249969* (2015.04)

(58) Field of Classification Search
None
See application file for complete search history.

(56) References Cited

U.S. PATENT DOCUMENTS

| | | | | |
|---|---|---|---|---|
| 3,025,182 | A * | 3/1962 | Schrewelius | 427/449 |
| 3,081,530 | A * | 3/1963 | Wlodek | 428/636 |
| 3,617,349 | A * | 11/1971 | Prasse | B23P 15/08 |
| | | | | 277/442 |
| 3,620,137 | A * | 11/1971 | Prasse | 92/159 |
| 3,690,686 | A * | 9/1972 | Prasse et al. | 277/444 |
| 4,592,964 | A * | 6/1986 | Buran et al. | 428/610 |
| 5,434,210 | A | 7/1995 | Rangaswamy et al. | |
| 5,595,616 | A | 1/1997 | Berczik | |
| 5,693,156 | A | 12/1997 | Berczik | |
| 7,410,701 | B2 * | 8/2008 | Yasui et al. | 428/421 |
| 7,794,520 | B2 * | 9/2010 | Murty | B22F 9/082 |
| | | | | 75/245 |

(Continued)

FOREIGN PATENT DOCUMENTS

| | | | | |
|---|---|---|---|---|
| CN | 102424928 | * | 4/2012 | C22C 1/05 |
| JP | 2003064463 | * | 3/2002 | C23C 4/04 |
| WO | WO2012166604 | * | 12/2012 | C09B 1/02 |

OTHER PUBLICATIONS

Schneibel et al., "Assessment of Processing Routes and Strength of a 3-Phase Molybdenum Boron Silicide (Mo5Si3—Mo5SiB2—Mo3Si)", 1998, Scripta Materialia, vol. 38, pp. 1169-1176.*

(Continued)

*Primary Examiner* — Humera Sheikh
*Assistant Examiner* — Seth Dumbris
(74) *Attorney, Agent, or Firm* — Cantor Colburn LLP

(57) ABSTRACT

A composite includes a porous matrix that includes a molybdenum-silicon-boron (Mo—Si—B) alloy that has a plurality of pores with a lubricant in contact with the Mo—Si—B alloy, a hydrophobic compound in contact with the Mo—Si—B alloy, or a combination thereof. A method for preparing a porous composite includes disposing a porous matrix comprising a Mo—Si—B alloy on a substrate, the Mo—Si—B alloy comprising a plurality of pores; disposing a lubricant on a surface of the porous matrix; and disposing a hydrophobic compound on a surface of the porous matrix to form the porous composite.

17 Claims, 1 Drawing Sheet

(56) References Cited

U.S. PATENT DOCUMENTS

| | | | | |
|---|---|---|---|---|
| 7,806,995 | B2* | 10/2010 | Jehanno | 148/423 |
| 2004/0126613 | A1* | 7/2004 | Bewlay | C23C 26/00 428/663 |
| 2005/0107220 | A1 | 5/2005 | Wang | |
| 2007/0227299 | A1 | 10/2007 | Marchiando et al. | |
| 2008/0145554 | A1* | 6/2008 | Ghasripoor et al. | 427/450 |
| 2009/0011266 | A1* | 1/2009 | Cochran et al. | 428/545 |
| 2010/0187925 | A1* | 7/2010 | Tingler et al. | 310/87 |

OTHER PUBLICATIONS

Beckman et al., "An analysis of electrical resistivity of compositions within the Mo—Si—B ternary system part II: Multi-phase composites", 2001, Materials Science & Engineering A, vol. 299, pp. 94-104.*

H. Choe et al., "Ambient to high temperature fracture toughness and fatigue-crack propagation behavior in a Mo—12Si—8.5B (at.%) intermetallic", Intermetallics 9 (2001), p. 319-329.

I. Rosales et al., "Stoichiometry and mechanical properties of Mo3Si", Intermetallics 8 (2000), p. 885-889.

J.H. Schneibel, "High temperature strength of Mo—Mo3Si—Mo5SiB2 molybdenum silicides", Intermetallics 11 (2003), p. 625-632.

J.H. Schneibel et al., "A Mo—Si—B intermetallic alloy with a continuous a-Mo matrix", Scripta Materialia 46 (2002), p. 217-221.

J.J. Kruzic et al., "Ambient- to Elevated-Temperature Fracture and Fatigue Properties of Mo—Si—B Alloys: Role of Microstructure", Metallurgical and Materials Transactions a U.S. Government Work, vol. 36A, Sep. 2005, p. 2393-2402.

M.G. Mendiratta et al., "Oxidation behavior of aMo—Mo3Si—Mo5SiB2 (T2) three phase system", Intermetallics 10 (2002), p. 225-232.

R.D. Field et al. , "Dislocations in Mo5SiB2 T2 phase", Intermetallics 9 (2001), p. 863-868.

International Search Report and Written Opinion for related PCT Application No. PCT/US2014/033131, dated Sep. 12, 2014, pp. 1-14.

Rockett, "Flexural Testing of Molybdenum—Silicon—Boron Alloys Reacted from Molybdenum, Silicon Nitride, and Boron Nitride", Georgia Institute of Technology, Aug. 16, 2007, pp. 1-85.

* cited by examiner

HYDROPHOBIC POROUS HARD COATING WITH LUBRICANT, METHOD FOR MAKING AND USE OF SAME

BACKGROUND

High temperature applications demand materials that are resilient and preferably long lasting in a multitude of environmental extremes such as under high chloride conditions and loads. Failure of materials in these regimes can be due to inadequate strength or fatigue resistance and also can be a result of corrosion of the materials by oxidation or other reactive decomposition mechanisms.

In advanced energy, power, and transportation systems, material failure can have dire economic. Similarly, in areas such as wellbore drilling and completion, materials for tools and devices should be robust and capable of withstanding harsh downhole conditions, including mechanical stresses from subterranean operations. Corrosion and wear of these tools can lead to their destruction or malfunction. For example, drill bits can become prematurely worn or experience binding with formation material such as rock or sand particles. Removal of the tool and introduction of a new tool to complete or perform a job is time consuming and costly. Moreover, in directional drilling, efforts are made to control the direction of the drill path in order to reach the correct predefined location in a subterranean formation, but tools such as drill bits that labor excessively or bind can produce deviations from the planned direction. Further, downhole conditions can cause premature aging and destruction of downhole tools, rendering them inefficient or ineffectual.

Materials and methods for producing high strength, oxidation resistant materials are always well received in the art.

BRIEF DESCRIPTION

The above and other deficiencies of the prior art are overcome by, in an embodiment, a composite comprising a porous matrix including a molybdenum-silicon-boron (Mo—Si—B) alloy, the Mo—Si—B alloy having a plurality of pores; and a lubricant in contact with the Mo—Si—B alloy, a hydrophobic compound in contact with the Mo—Si—B alloy, or a combination thereof.

In another embodiment, a method for preparing a porous composite comprises: disposing a porous matrix comprising a molybdenum-silicon-boron (Mo—Si—B) alloy on a substrate, the Mo—Si—B alloy comprising a plurality of pores; disposing a lubricant on a surface of the porous matrix; and disposing a hydrophobic compound on a surface of the porous matrix to form the porous composite.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a solid lubricant and a hydrophobic compound disposed in a molybdenum-silicon-boron (Mo—Si—B) alloy provides a porous, super-hard coating for a substrate and is resilient in harsh environments. Such a composite exhibits excellent wear, friction, and oxidation resistance while being hydrophobic. The porous matrix of the composite herein is useful in high temperature applications and has high strength, creep resistance, fatigue resistance, and oxidation resistance at a temperature greater than 1000° C., which exceeds that for many metallic materials, including, e.g., super alloys and metal aluminides.

The matrix of the composite herein includes a refractory metal such as molybdenum to achieve a high melting point and excellent high temperature mechanical properties. Further, silicon in the alloy allows for oxidation resistance, and boron increases the oxidation resistance of the Mo—Si—B alloy in the composite. Additionally, the porous matrix of the composite herein containing Mo—Si—B alloys has microstructures composed of a dispersion of a high volume fraction of intermetallic phases such as $Mo_3Si$ (A15 phase) and $Mo_5SiB_2$ (T2 phase) in a ductile solid solution Mo matrix, resulting in composites of the alloys that have very high temperature applications. Moreover, the fracture toughness of the alloy is enhanced by the ductile molybdenum phase, and the intermetallic phases of the alloy produce high temperature creep strength and oxidation resistance. Powder metallurgical processing of the pre-alloy components allows control over the resulting microstructure without oxidation of the silicon and boron components, which can be prone to oxidation during processing. The matrix of the composite is thus useful for drilling and completion tools as well as other articles that could benefit from a high temperature, hard, corrosion resistant coating, surface, or material.

Figure 1:
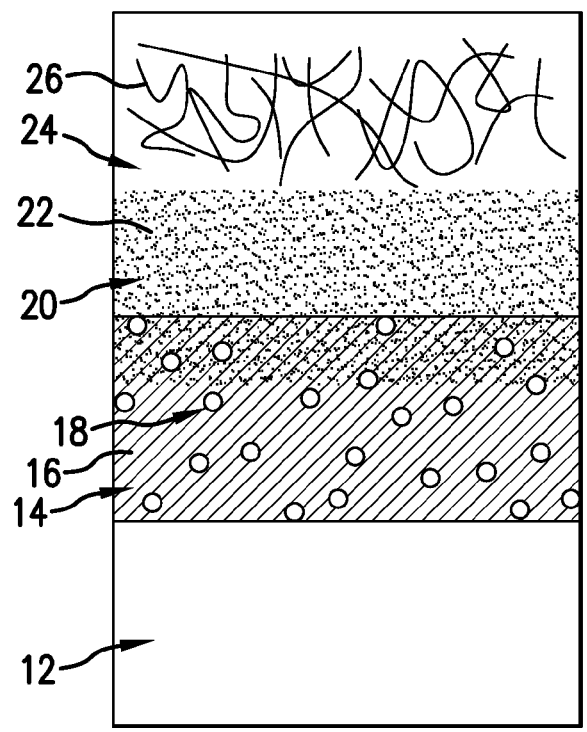
FIG. 1 shows a cross-section of a composite according to an embodiment described herein.

In an embodiment, a composite includes a porous matrix having a molybdenum-silicon-boron (Mo—Si—B) alloy, which has a plurality of pores. A lubricant, hydrophobic compound, or combination thereof is in contact with the Mo—Si—B alloy. The composite can also contain a substrate upon which the porous matrix is disposed. As shown in FIG. 1, the composite 10 has a substrate 12 with a matrix layer 14 disposed thereon. The matrix layer 14 includes a porous matrix 16 having a plurality of pores 18 distributed in the porous matrix 16. A lubricant layer 20 is disposed on the matrix layer 14, and a hydrophobic layer 24 also is disposed on the matrix layer 14. The lubricant layer 20 contains a lubricant 22, and the hydrophobic layer 24 contains a hydrophobic compound. Although FIG. 1 shows that the lubricant layer contacts the matrix layer 16, the hydrophobic layer 24 can be interposed between the lubricant layer 20 and the matrix layer 14. In some embodiments, the lubricant layer 20 or the hydrophobic layer 24 can be absent from the composite 10. Thus, in an embodiment, the composite includes the porous matrix 16 of the Mo—Si—B alloy and pores 18 with the hydrophobic compound 26. In another embodiment, the composite includes the porous matrix 16 of the Mo—Si—B alloy and pores 18 with the lubricant 22.

Figure 2:
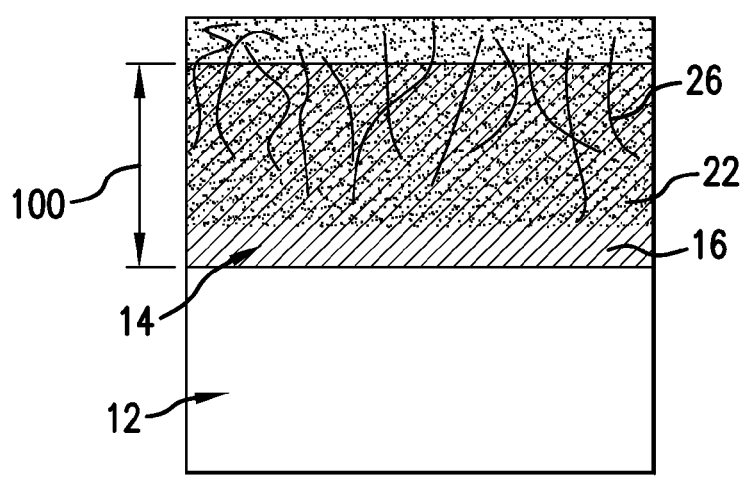
FIG. 2 shows a cross-section of a composite according to an embodiment described herein.

Moreover, the lubricant 22 or the hydrophobic compound 26 can be disposed in the pores 18 of the porous matrix 16. In an embodiment, the porous matrix 16 contains only the Mo—Si—B alloy with the pores 18 occurring in the Mo—Si—B alloy. According to an embodiment, the porous matrix contains the Mo—Si—B alloy and other constituents such as an additional element or compound (e.g., a metal such as Nb, Ta, Ti, Al, and the like; a ceramic such as BN, WC, AlN, $Al_2O_3$, and the like; a polymer such as an elastomer; or a nanoparticle such as carbon nanotubes, graphene, and the like). As shown in FIG. 2, the composite 50 is arranged so that the matrix layer 14 having the porous matrix 16 is disposed on the substrate 12. The porous matrix 16 includes the plurality of pores 18 even though not shown in FIG. 2. Here, the lubricant 22 is disposed in the pores 18 of the porous matrix 16. The hydrophobic compound 26 is also disposed in the pores 18 of the porous matrix 16. As illustrated in FIGS. 1 and 2 of the composite (10, 50), numerous arrangements exist for the relative position of the lubricant 22, hydrophobic compound 26, and porous matrix 16. According to an embodiment, the lubricant 22 is disposed in a pore 18 of the porous matrix 16, disposed on a surface of the porous matrix 16, disposed on a surface of the hydrophobic compound 26, disposed in the hydrophobic compound 26, or a combination thereof. In some embodiments, the hydrophobic compound 26 is disposed in a pore 18 of the porous matrix 16, disposed on a surface of the porous matrix 16, disposed on a surface of the lubricant 22, disposed in the lubricant 22, or a combination thereof.

The lubricant 22 can be disposed in the porous matrix 16 as well as on a surface of the porous matrix 16 so that the some of the lubricant 22 can form the lubricant layer 20 while some of the lubricant 22 is in the matrix layer 14. The concentration of the lubricant 22 can be uniform throughout the porous matrix 16, or the concentration of the lubricant 22 can have a gradient in the porous matrix 16. In an embodiment, the matrix layer 14 includes the lubricant 22 throughout the porous matrix 16. In another embodiment, the matrix layer 14 has a portion of the porous matrix 16 that includes the lubricant 22 and a portion of the porous matrix 16 without any lubricant 22.

As with the lubricant 22, the hydrophobic compound 26 can be disposed in the porous matrix 16 as well as on a surface of the porous matrix 16 so that some of the hydrophobic compound 26 can form the hydrophobic layer 24 while some of the hydrophobic compound 26 is in the matrix layer 14. The concentration of the hydrophobic compound 26 can be uniform throughout the porous matrix 16, or the concentration of the hydrophobic compound 26 can have a gradient in the porous matrix 16. In an embodiment, the matrix layer 14 includes the hydrophobic compound 26 throughout the porous matrix 16. In another embodiment, the matrix layer 14 has a portion of the porous matrix 16 that includes the hydrophobic compound 26 and a portion of the porous matrix 16 without any hydrophobic compound 26. In some embodiments, the composite can include multiple layers of the matrix layer 14, the lubricant layer 20, or the hydrophobic layer 24 in any order of these, or a combination thereof.

The elements included in the porous matrix can be selected to provide high strength and chemical resistance (e.g., hydrophobicity and oxidation resistance). According to an embodiment, the porous matrix includes molybdenum, silicon, and boron in the Mo—Si—B alloy. Due to the relative amounts of the three elements in the Mo—Si—B alloy, the Mo—Si—B alloy can include a phase such as a single phase (e.g., α-Mo), a binary phase (e.g., $Mo_3Si$, $Mo_5Si_3$, $MoSi_2$, $Mo_2B$, $MoB$, $B_2O_3$, $SiO$, $SiO_2$, and the like), a ternary phase (e.g., $Mo_5SiB_2$ and the like), or a combination thereof. In an embodiment, a first phase can be continuous with precipitate particles of a second phase disposed therein. As used herein, "continuous" with respect to a phase in the Mo—Si—B alloy refers to the particular phase being connected without a portion of the phase being isolated from the rest of the phase. According to an embodiment, the first phase is α-Mo, and the second phase is a binary or ternary phase. In an alternative embodiment, the first phase is a binary or ternary phase, and the second phase is α-Mo.

The Mo—Si—B alloy can include a phase modifier. As used herein, "phase modifier" refers to an element or compound that changes the relative amount (e.g., atomic percentage) of Mo, Si, and B in a phase of the Mo—Si—B alloy. Therefore, the phase boundaries that separate the phases in a phase diagram for the Mo—Si—B alloy are shifted for a given temperature when the phase modifier is present. Exemplary phase modifiers include refractory metals such as W, Nb, V, Cr, Ta, and the like or transition metals such as Ti, Zr, Hf, and the like. A combination of the phase modifiers can be used. Introduction of such a phase modifier can produce a grain in the microstructure of the Mo—Si—B alloy that can include, e.g., $(Mo,W)_5Si_2$, $(Mo,W)Si_2$, $(Mo,W)_5SiB_2$, and the like.

In the composite, the lubricant includes a transition metal, a post-transition metal, a metalloid, a ceramic, graphene, carbon nanotubes, or a combination thereof. Suitable transition metals include Ti, Zr, V, Nb, Ta, Cr, W, Mn, Fe, Ru, Co, Rh, Ir, Ni, Pd, Pt, Cu, Ag, Au, Zn, or a combination thereof. Post-transition metal include, e.g., Al, In, Sn, Pb, and the like, and metalloids include B, Si, Sb, and the like. These elements can be used alone or in combination, including allotropes, compounds, catenates, alloys, oxides, nitrides, carbides, or nanoparticles (e.g., nanowires, nanotubes, and the like) thereof.

The ceramic is not particularly limited and can be selected depending on the particular application of the composite. Examples of the ceramic include an oxide-based ceramic, nitride-based ceramic, carbide-based ceramic, boride-based ceramic, silicide-based ceramic, or a combination thereof. In an embodiment, the ceramic is silica ($SiO_2$), titania ($TiO_2$), boron nitride (BN), and the like. The oxide-based ceramic, nitride-based ceramic, carbide-based ceramic, boride-based ceramic, or silicide-based ceramic can contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hathium, yttrium, and the like), alkali metal (e.g., lithium, potassium, and the like), alkaline earth metal (e.g., calcium, magnesium, strontium, and the like), rare earth (e.g., lanthanum, cerium, and the like), metalloid (boron, silicon, and the like), or halogen (e.g., fluorine, chlorine, and the like).

The nanotubes may include carbon nanotubes, inorganic nanotubes, metallated nanotubes, or a combination comprising at least one of the foregoing. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

Graphene, including nanographene and graphene fibers, are derivatized according to the method disclosed herein. Graphene and nanographene are effectively two-dimensional particles of nominal thickness, having one or more layers of fused hexagonal rings of carbon atoms with an extended delocalized π-electron system, layered and weakly bonded to one another through π-π stacking interaction. Graphene in general, and including nanographene, can be in one embodiment a single sheet, or in another embodiment be a stack of several sheets of such extended carbon rings. The sheets have in some embodiments, micro-scale dimensions (i.e., an average particle size of less than about 1 μm); nano-scale, (i.e., an average particle size of greater than or equal to about 1 μm); or both micro- and nano-scale dimensions.

In an embodiment, the carbon nanotubes or graphene has a metal coating that includes Ni, Cu, and the like on a surface thereof. The metal surface coverage can be uniform or non-uniform, and the surface density of the metal can include complete coverage of the carbon atoms or incomplete coverage of the carbon atoms of the nanotubes or graphene.

According to an embodiment, the composite includes a lubricant that is aluminum, indium, tin, antimony, germanium, zinc, copper, boron nitride, graphene, carbon nanotubes, or a combination thereof.

In the composite, the hydrophobic compound can be disposed in the pores of the porous matrix and can include a polymer. In particular, the polymer can be a fluoropolymer having repeat units that include vinylidene fluoride, hexafluoropropylene, tetrafluoroethylene, chlorotrifluoroethylene, perfluoro(alkyl vinyl ether), perfluoro(ethyl vinyl ether), perfluoro(propyl vinyl ether), or a combination thereof.

The fluoropolymer exhibits mechanical, thermal, and chemical stability and can be a high fluorine content polymer that provides hydrophobicity to the composite. In an embodiment, the fluoropolymer is completely fluorinated. In another embodiment, the fluoropolymer is partially fluorinated. In some embodiments, the fluoropolymer is a blend of fluorinated polymers, copolymers, terpolymers, or a combination thereof. The fluoropolymer also can be an oligomer, a homopolymer, a copolymer, a block copolymer, an alternating block copolymer, a random polymer, a random copolymer, a random block copolymer, a graft copolymer, a star block copolymer, a dendrimer, or the like, or a combination thereof.

In a fluoropolymer that is a copolymer, the repeat units can be completely fluorinated, partially fluorinated, or a combination comprising at least one of the foregoing. The repeat units of the fluoropolymer can include vinylidene fluoride units, hexafluoropropylene units (HFP), tetrafluoroethylene units (TFE), chlorotrifluoroethylene (CTFE) units, perfluoro(alkyl vinyl ether) units (PAVE) (e.g., perfluoro(methyl vinyl ether) units (PMVE), perfluoro(ethyl vinyl ether) units (PEVE), and perfluoro(propyl vinyl ether) units (PPVE)), or a combination thereof.

Exemplary fluoropolymers include polytetrafluoroethylene (PTFE, available under the trade name Teflon from DuPont), polyethylenetetrafluoroethylene (ETFE, available under the trade name Teflon ETFE or Tefzel from DuPont), fluorinated ethylene propylene copolymer (FEP, available under the trade name Teflon FEP from DuPont), perfluoroalkoxy polymer (PFA, available under the trade name Teflon PFA from DuPont), polyvinylidene fluoride (PVDF, available under the trade name Hylar from Solvay Solexis S.p.A.), polyvinylfluoride (PVF, available under the trade name Tedlar from DuPont), polychlorotrifluoroethylene (PCTFE, available under the trade name Kel-F from 3M Corp. or Neoflon from Daikin), polyethylenechlorotrifluoroethylene (ECTFE, available under the trade name Halar ECTFE from Solvay Solexis S.p.A.), chlorotrifluoroethylenevinylidene fluoride (FKM fluorocarbon, available under the trade name Viton from FKM-Industries), perfluoroelastomer such as FFKM (available under the trade name Kalrez from DuPont), tetrafluoroethylene-propylene elastomeric copolymers such as those available under the trade name Aflas from Asahi Glass Co), perfluoropolyether (available under the trade name Krytox from DuPont), perfluorosulfonic acid (available under the trade name Nafion from DuPont), and the like. Other exemplary fluoropolymers include copolymers of vinylidene fluoride and hexafluoropropylene and terpolymers of vinylidene fluoride, hexafluoropropylene, and tetrafluoroethylene. Such fluoropolymers are compatible with the lubricant and Mo—Si—B alloy. The fluoropolymers also have beneficial flow properties such that the hydrophobic compound including the fluoropolymer can flow into the pores of the Mo—Si—B alloy while providing the alloy with hydrophobicity. In a specific embodiment, the hydrophobic compound is polytetrafluoroethylene.

In addition to the porous matrix, the lubricant, and the hydrophobic compound, the composite can include a substrate. The substrate can be any material to which the porous matrix can bond, adhere, or adsorb, e.g., via chemisorption or physisorption. According to an embodiment, the substrate includes a polymer, metal, alloy, ceramic, cermet, or a combination thereof. The substrate can be a hard or hardened material, e.g., steel, WC, Co bonded WC, diamond (e.g., a polycrystalline diamond compact (PDC)). It is contemplated the substrate is an alloy of, e.g., Fe, Ni, Mg, Ti, Al, Cu or a combination thereof. Depending on the processing parameters employed to dispose the Mo—Si—B on the substrate, the substrate can include a soft material such as a polymer.

Types of polymers useful as the substrate (and which may be functionalized to form a crosslinkable system (e.g., a thermoset)) include fluoropolymers or perfluoroelastomers (inclusive of those above-mentioned), hydrogenated nitrile butyl rubber, ethylene-propylene-diene monomer (EPDM) rubber, silicones, epoxy, polyetheretherketone, bismaleimide, polyvinyl alcohol, phenolic resins, polycarbonates, polyesters, polyurethanes, tetrafluoroethylene-propylene elastomeric copolymers, or a combination comprising at least one of the foregoing resins.

Exemplary polymers include: phenolic resins such as those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), polycarbonates such as bisphenol A polycarbonate, nitrile-butyl rubber (NBR), hydrogenated nitrile-butyl rubber (HNBR), high fluorine content fluoroelastomers rubbers such as those in the FKM family and marketed under the tradename VITON® (available from FKM-Industries) and perfluoroelastomers such as FFKM (also available from FKM-Industries) and also marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like. Combinations of these polymers may also be used.

Other examples of thermoplastic polymers include polyamides, polyimides, polyetherimides, polyphenylene sulfides (PPS), polyaryletherketones (PAEK), polyethersulfones (PESU), polyphenylenesulfones (PPSU), polyphenylenesulfone ureas, or the like, or combinations thereof. The thermoplastic polymers are linear or branched and are homopolymers or copolymers that include two or more of the foregoing exemplary polymers. The thermoplastic polymers can further be chemically modified to include, for example, functional groups such as halogen, alcohol, ether, ester, amide, etc., or can be oxidized, hydrogenated, etc. Exemplary thermoplastics include polyphenylene sulfides with either a branched structure, such as those marketed under the tradename RYTON® by Chevron-Phillips, or a linear structure, such as those marketed under the tradename FORTRON® by Ticona. In an embodiment, the thermoplastic polymer is a polyphenylene sulfide. Further, the polyphenylene sulfide may be p-polyphenylene sulfide, m-polyphenyl In a specific embodiment, the thermoplastic polymer is branched.

The polymer can be in many different formats including pellets, powder, sheet, etc. and can be processed to attain a particular size or shape. During processing, additives (e.g., nanoparticles of carbon, metals, or polysilsesquioxanes, graphene, carbon or glass, fiber, and the like) can be added to the polymer to achieve certain properties such as a desired glass transition temperature, yield strength, thermal decomposition temperature, and the like.

In the composite, relative amounts of the constituent atoms of the porous matrix, namely the Mo—Si—B alloy, can determine the properties of the alloy and the composite. In an embodiment, Mo is present in the Mo—Si—B alloy in a majority amount, i.e., an amount greater than the amounts of the Si and B. Here, amount refers to an atomic amount such as atomic percentage of an element, e.g., an atomic percentage (at %) of Mo. In an embodiment, Mo is present in the Mo—Si—B alloy in an amount from 70 at % to 98 at %, specifically 75 at % to 98 at %, and more specifically 80 at % to 98 at %, based on a total atomic amount of Mo, Si, and B in the Mo—Si—B alloy. According to an embodiment, Si is present in the Mo—Si—B alloy in an amount from 2 at % to 25 at %, specifically 5 at % to 25 at %, and more specifically 5 at % to 20 at %, based on a total atomic amount of Mo, Si, and B. The B atom can be present in the Mo—Si—B alloy in an amount from 1 at % to 15 at %, specifically 1 at % to 10 at %, and more specifically 5 at % to 10 at %, based on a total atomic amount of Mo, Si, and B. In an embodiment, the Si and B are present in the Mo—Si—B alloy in an amount respectively from 7 at % to 12 at % of Si and from 9 at % to 14 at % of B, with a balance being Mo, based on the total atomic amount Mo, Si, and B in the Mo—Si—B alloy. In some embodiments, the amount of Si present in the Mo—Si—B alloy is greater than or equal to the amount of B that is present in the Mo—Si—B alloy. An atomic ratio of Si:B in the Mo—Si—B alloy can be from 1:10 to 100:1, specifically 1:2 to 50:1, and more specifically 1:2 to 5:1. According to an embodiment, the atomic ratio of Si:B in the Mo—Si—B alloy can be is from 1.2:1 to 2:1.

While the relative atomic amounts of Mo, Si, B in the Mo—Si—B alloy of the porous matrix can vary, exemplary Mo—Si—B alloys include Mo-20Si-10B, Mo-6Si-5B, Mo-4Si-2B, Mo-13Si-12B, Mo-12Si-8B, and the like. In this nomenclature, the atomic percentage of each element is represented by a number preceding the element with the exception of Mo, which is understood to constitute the balance so that the total atomic percentage is 100 at %. Thus, for a Mo—Si—B alloy represented by Mo-20Si-10B, the alloy includes 70 at % Mo, 20 at % Si, and 10 at % B.

The volume percentage of the α-Mo phase in the Mo—Si—B alloy can mediate the physical and chemical properties of the porous matrix, including its creep strength. The volume percentage (vol %) of the α-Mo phase can be from 5 vol % to 50 vol %, based on the total volume of the Mo—Si—B alloy. The relative size or continuity of the α-Mo phase also can determine the physical and chemical properties of the porous matrix. In some embodiments, α-Mo phase in the Mo—Si—B alloy is discontinuous and present in an amount of greater than 35 vol %. In another embodiment, the α-Mo phase is present in the Mo—Si—B alloy as continuous, coarse grains in an amount of greater than 40 vol %.

In addition to the Mo, Si, and B in the Mo—Si—B alloy, the Mo—Si—B alloy can include the phase modifier in an amount effective to alter the atomic composition of the Mo, Si, B in a given phase at a given temperature. In an embodiment, the phase modifier is present in the Mo—Si—B alloy in an amount from 0 at % to 5 at %, specifically 0.01 at % to 1 at %, and more specifically 0.05 at % to 0.5 at %, based on a total atomic amount of the phase modifier, Mo, Si, and B in the Mo—Si—B alloy.

In the composite, the amount of the Mo—Si—B alloy, lubricant, or hydrocarbon compound can be selected to achieve certain chemical and physical properties. The Mo—Si—B alloy can be present in the composite in an amount from 30 wt % to 90 wt %, specifically 40 wt % to 90 wt %, and more specifically 50 wt % to 80 wt %, based on a total weight of the Mo—Si—B alloy, the lubricant, and the hydrophobic compound. The lubricant can present in the composite in an amount from 0 wt % to 70 wt %, specifically 0 wt % to 50 wt %, and more specifically 5 wt % to 30 wt %, based on a total weight of the Mo—Si—B alloy, the lubricant, and the hydrophobic compound. The hydrophobic compound can be present in the composite in an amount from 0 wt % to 70 wt %, specifically 0 wt % to 50 wt %, and more specifically 5 wt % to 30 wt %, based on a total weight of the Mo—Si—B alloy, the lubricant, and the hydrophobic compound.

The composite can be made in various ways. In an embodiment, a method for preparing a porous composite includes disposing a porous matrix comprising the Mo—Si—B alloy on a substrate, disposing a lubricant on a surface of the porous matrix, and disposing a hydrophobic compound on a surface of the porous matrix to form the porous composite. The Mo—Si—B alloy includes a plurality of pores that can be formed as the Mo—Si—B alloy is formed on the substrate.

According to an embodiment, a layered structure can be formed on the substrate as shown in FIG. 1. Here, some of the lubricant or hydrophobic compound can be disposed in the pores of the Mo—Si—B alloy. It is contemplated that a portion, if not a substantial amount or all, of the lubricant or hydrophobic compound can be disposed on a surface of the Mo—Si—B alloy without significant or any disposal of the lubricant or hydrophobic compound in the pores of the Mo—Si—B alloy.

The method further includes heating the porous composite to decrease the viscosity of the lubricant or hydrophobic compound. Heating can comprise heating the composite to a temperature effective to cause the lubricant of hydrophobic compound to reach or nearly reach its respective melting point. Therefore, in an embodiment, the lubricant or hydrophobic compound is heated to a temperature equal to or greater than its melting temperature. Consequently, the method also includes flowing the lubricant in the plurality of pores or flowing the hydrophobic compound in the plurality of pores. In some embodiments, the lubricant or hydrophobic compound is absent and not disposed on the porous matrix. The order of disposing the lubricant and hydrophobic compound can be varied so that the lubricant is disposed before, after, or simultaneously as the disposal of the hydrophobic compound on the porous matrix.

The lubricant or hydrophobic compound can be disposed onto the porous matrix by introducing a liquid phase or gas phase of the lubricant or hydrophobic compound on the porous matrix. Such deposition methods include spraying, dip coating, physical vapor deposition (PVD), chemical vapor deposition (CVD), electroless plating, electro plating, and the like. For metallic species of lubricant, PVD or CVD can dispose the lubricant on the surface as well as in pores of the porous matrix.

The Mo—Si—B alloy can be disposed on the substrate in various ways. In an embodiment, a Mo—Si—B powder is first made by contacting Mo—$Si_3N_4$ with BN. A reaction between these two precursors occurs in which a plurality of grains of the Mo—Si—B alloy is formed. The plurality of grains are heated and thereafter consolidated by applying pressure to produce a Mo—Si—B alloy compact. Thus, Mo—Si—B is created in a reaction with subsequent formation of the compact of the alloy. The temperature during the consolidation can be from 1200° C. to 1700° C., specifically 1500° C. to 1600° C. The applied pressure can be from 100 megapascals (MPa) to 200 MPa, specifically 150 MPa to 250 MPa for a time of 180 minutes to 7 hours, specifically 180 minutes to 4 hours.

The Mo—Si—B alloy compact thereafter can be subjected to energetic removal of particles of the Mo—Si—B alloy and deposition of those particles onto the substrate with concomitant pore formation in the Mo—Si—B alloy on the substrate to form the porous matrix. That is, disposing the porous matrix on the substrate includes removing a portion of the Mo—Si—B alloy from the Mo—Si—B alloy compact and depositing the Mo—Si—B alloy on the substrate to form the porous matrix. Thus, the Mo—Si—B alloy can be disposed on the substrate by a PVD process by impinging the Mo—Si—B alloy compact with, e.g., ions or electrons from a sputtering source, laser irradiation, and the like.

In another embodiment, the Mo—Si—B powder is made by consolidating a powder of the Mo—Si—B alloy and sintering the powder to produce a Mo—Si—B alloy compact. Disposing the porous matrix on the substrate can include removing a portion of the Mo—Si—B alloy from the Mo—Si—B compact and depositing the Mo—Si—B alloy on the substrate to form the porous matrix. Here, consolidate premixed powders of Mo—Si—B can be subjected to hot isostatic pressing or spark plasma sintering (SPS) to make a sputtering target suitable for PVD using, e.g., energetic charged particles (e.g., electrons or ions) to remove the Mo—Si—B alloy from the target and to coating the substrate with the Mo—Si—B alloy that contains pores.

In an embodiment, consolidating the particles of Mo—Si—B can be accomplished by sintering, which can involve heating at a temperature of greater than or equal to about 1000° C., and specifically greater than or equal to about 1500° C. In an embodiment, the temperature used can be from about 1200° C. to about 1700° C., specifically from about 1300° C. to about 1650° C. The pressure used can be from 1 gigapascal (GPa) to 15 GPa, specifically 2 GPa to 15 GPa, and more specifically 3 GPa to 10 GPa.

During preparation of the composite, a layer of lubricant or hydrophobic compound can be disposed on the porous matrix. Thereafter, the lubricant or hydrophobic compounds are heated to flow the lubricant or hydrophobic compound into pores disposed in the porous matrix. After transfer of the lubricant or hydrophobic compound into the pores of the porous matrix, some of the porous matrix, the lubricant, or the hydrophobic compound can still be exposed to an area external to the composite. In this manner, the composite can have surface properties afforded by the porous matrix, the lubricant, or the hydrophobic compound. In an embodiment, the composite is hydrophobic due to the presence of the hydrophobic compound. The hydrophobicity of the composite can be characterized with regard to the contact angle of a polar substance with respect to a surface of the composite at a temperature. In this regard, the contact angle of water with composite at room temperature can be from 90° to 160°, specifically 90° to 150°, and more specifically 110° to 130°. Consequently, the composite can be hydrophobic or superhydrophobic. The hydrophobic compound thus can provide hydrophobicity to the composite such that contact of the composite with polar substances including water containing solutions and compositions is minimized or avoided. In this fashion, corrosion or accumulation of material from the water (e.g., scale or reaction products) is avoided, diminished, or eliminated by the presence of the hydrophobic compound in or on the porous matrix that produces a hydrophobic composite even though the composite contains pores within the Mo—Si—B alloy.

In some embodiments, the hydrophobic compound is absent from the composite, and the contact angle of water with composite at room temperature can be from 0° to 160°, specifically 0° to 100°, and more specifically 0° to 50°. Consequently, the composite can be hydrophobic or hydrophilic without the hydrophobic compound.

The composite has beneficial tribological properties such as a low friction due to the presence of the lubricant. Although the Mo—Si—B alloy is a hard, porous material, the presence of the lubricant in the porous matrix lubricates the composite to achieve advantageous tribological properties so that wear on the composite or another material or item in contact with the composite is reduced, thus increasing the lifetime of the composite or other item in contact with the composite. The lubricant can lower frictional forces (e.g., dry friction, fluid friction, lubricated friction, skin friction and the like) exerted on the composite.

Although the lubricant can be disposed on the porous matrix in a solid, liquid, or gas form, the lubricant is a solid at a temperature consistent with the operating temperature of the composite. The lubricant can have a melting temperature greater than or equal to 150° C., specifically greater than or equal to 350° C., more specifically greater than or equal to 500° C., even more specifically greater than or equal to 1000° C., and yet more specifically greater than or equal to 1500° C.

Similarly, the hydrophobic compound can be a polymer that is soft and flexible or flowable at a temperature so that it can be disposed in the pores of the Mo—Si—B alloy. At the operating temperature of the composite, the hydrophobic compound imparts hydrophobicity to the composite and can be rigid or flexible. The rigidity or flexibility of the hydrophobic compound can depend on its crosslink density if crosslinked and the temperature relative to its glass transition temperature if applicable. In an embodiment, the hydrophobic compound is disposed in the pores of the porous matrix such that, at a temperature above the glass transition temperature of the hydrophobic compound, the hydrophobic compound remains disposed in the pores of the porous matrix.

The lubricant and hydrophobic compound are disposed in the plurality of pores of the porous matrix. The pores can be connected or disconnected throughout the volume or thickness of the porous matrix. Likewise, some of the pores can be isolated from one another while other pores are connected. According to an embodiment, the pores can be connected to form a communication pathway from a surface of the porous matrix that contacts the substrate to a surface of the porous matrix that is not in contact with the substrate, such as a surface of the porous matrix that is opposite the substrate. In an embodiment, the pores are present in the porous matrix in amount from 5 volume percent (vol %) to 45 vol %, specifically 5 vol % to 40 vol %, and more specifically 10 vol 5 to 35 vol %, based on the total volume of the porous matrix. In addition to the amount of pores in the porous matrix, the pores can have a shape that is the same or different throughout the porous matrix. The pore can be spherical, pear-shaped, elongate as in columnar or elliptical shaped pores that are oblate or prolate, and the like. In non-spherical pores or pores that are connected, the orientation of the major axis (the axis with the longest linear dimension in the pore or connected pores) can be any direction with respect to the substrate, including parallel, perpendicular, skew, or a combination thereof for the plurality of pores. The average pore size can be greater than or equal to 1 µm, specifically greater than or equal to 0.5 µm, and more specifically greater than or equal to 4 µm. The pore size can be from 0.5 µm to 100 µm, and specifically from 3 µm to 10 µm.

It is believed that the pores size can affect the depth of which the lubricant or hydrophobic compound can penetrate into the porous matrix. An extremely small pore size can hinder the flow of the lubricant or hydrophobic compound in the porous matrix. A depth of the lubricant or hydrophobic compound in the porous Mo—Si—B alloy can be from 0% to 100%, specifically 10% to 100%, and more specifically 50% to 100% of the thickness of the porous matrix, the thickness being a vertical distance as measured from opposing surfaces of the porous matrix with respect to the substrate as indicated by the double headed arrow 100 in FIG. 2. The thickness of the porous matrix, e.g., the porous Mo—Si—B alloy, is from 20 µm to 200 µm, specifically 20 µm to 180 µm, and more specifically 20 µm to 150 µm.

The composite herein has advantageous physical and chemical properties with respect to high temperature performance in addition to the tribological and hydrophobic properties. The composite exhibits excellent wear, friction, and oxidation resistance while being hydrophobic. The compressive strength of the porous matrix of the composite is greater than or equal to 60 kilopounds per square inch (ksi), specifically greater than or equal to 75 ksi, and more specifically greater than or equal to 85 ksi at a temperature greater than or equal to 1300° C. as measured by ASTM E. The high strength of the composition allows the composite to endure stress with low or negligible amounts of fracture or creep. The fracture toughness of the porous matrix of the composite is greater than or equal to 5 MPa m$^{1/2}$, specifically greater than or equal to 10 MPa m$^{1/2}$, and more specifically greater than or equal to 18 MPa m$^{1/2}$. Even though the composite is hard and strong, the composite is not brittle due to constituent atoms in the porous Mo—Si—B alloy and high strength intermetallic phases that are incorporated in the alloy.

Creep tests performed on the matrix of the composite determine an amount of deformation of the composite under a load as a function of time and thus provide a load-carrying ability for limited deformations. The resistance to creep of the porous matrix of the composite as determined by ASTM standard DS582 is greater than or equal to 400 MPa, specifically greater than or equal to 500 MPa, and more specifically greater than or equal to 600 MPa.

These material properties of the porous matrix of the composite can be selected or controlled by a ratio of the relative atomic percentages or ratio of Mo:Si:B atoms in the Mo—Si—B alloy. Thus, in an embodiment, the tensile strength of the composite can be selected by using a certain ratio of Mo:Si:B in the Mo—Si—B alloy. Additionally, hard particles such as ceramics can be included in the porous matrix to increase the strength of the composite.

The matrix of the composite also is corrosion resistant at elevated temperature, e.g., greater than 1000° C., specifically greater than 1200° C., and more specifically greater than 1300° C. In a particular embodiment, the composite is resistant to oxidation at a temperature greater than or equal to 1200° C. Without wishing to be bound by theory, it is believed that the oxidation resistance of the composite herein is due to a passivating combination of $SiO_2$ or $B_2O_3$ on a surface of the Mo—Si—B alloy that restricts oxidant introduction to a bulk of the porous Mo—Si—B alloy. The formation of borosilicate glass near or on the surface of the Mo—Si—B alloy can be formed during or after the deposition of the Mo—Si—B alloy on the substrate by, e.g., heating the Mo—Si—B alloy in the presence or absence of an oxidant such as $O_2$, air, and the like. Passivation of the porous Mo—Si—B alloy reduces or eliminates volatile Mo species such as $MoO_3$ from being formed or released from the Mo—Si—B alloy. The heat treatment can be performed at an elevated temperature up to or just below the melting temperature of the Mo—Si—B alloy, which can be on the order of 2000° C.

Numerous uses exist for the composite herein. The porous Mo—Si—B alloy, including the lubricant or hydrophobic compound disposed in pores of the Mo—Si—B alloy, can be used as a coating for various substrates to produce high temperature compatible articles that have oxidation resistance, high fracture strength, yield strength, and the like. Moreover, the porous Mo—Si—B coating can be electrically conductive, the conductivity being controlled by the amounts and composition of the atoms (Mo, Si, B, etc.) in the Mo—Si—B alloy and the lubricant or hydrophobic compound disposed in pores of the Mo—Si—B alloy. The electrical conductivity of the composite can be from $10^7$ Siemens per meter (S/m) to $10^{-23}$ S/m, specifically $10^6$ Siemens per meter (S/m) to $10^{-10}$ S/m, and more specifically $10^5$ Siemens per meter (S/m) to $10^{-1}$ S/m.

In an embodiment, the coating is applied to a sensor, heat exchanger, rotors or stators for engines or motors, fan blades, or a downhole tool including a drill bit, cutter, tubular, slip, cable, housing, seal, and the like to produce a composite. These composites reduce hydraulic losses and mitigate scale formation in, e.g., deep-water drilling and completion tools.

According to an embodiment, the composite, e.g., a downhole tool, is made by disposing the porous Mo—Si—B alloy on a drilling or completion tool to which a solid lubricant (e.g., graphene, indium, carbon nanotubes, etc.) are deposited. A layer of hydrophobic compound (e.g., polytetrafluoroethylene) is disposed on the solid lubricant followed by heating the composite to diffuse the solid lubricant and hydrophobic compound into the pores of the Mo—Si—B alloy.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The conjunction "or" is used to link objects of a list or alternatives and is not disjunctive; rather the elements can be used separately or can be combined together under appropriate circumstances.

What is claimed is:

1. A composite comprising:
    a porous matrix having a molybdenum-silicon-boron (Mo—Si—B) alloy, the Mo—Si—B alloy having a plurality of pores and comprising one or more of the following: α-Mo; $Mo_3Si$; $Mo_5SiB_2$; or Mo-20Si-10B; and
    a lubricant in contact with the Mo—Si—B alloy, a hydrophobic compound in contact with the Mo—Si—B alloy, or a combination thereof;
    wherein the lubricant is a solid lubricant and comprises one or more of the following: indium; tin; antimony; germanium; zinc; copper; boron nitride; graphene; or carbon nanotube; and further wherein an amount of the plurality of pores in the porous matrix is from 5 vol % to 40 vol %, based on a total volume of the porous matrix, and the average pore size is greater than or equal to 1 micron; and
    wherein a strength of the composite is greater than or equal to 500 MPa at a temperature greater than or equal to 1000° C.

2. The composite of claim 1, further comprising a substrate.

3. The composite of claim 2, wherein the lubricant is disposed in a pore of the porous matrix, disposed on a surface of the porous matrix, disposed on a surface of the hydrophobic compound, disposed in the hydrophobic compound, or a combination thereof; and
    the hydrophobic compound is disposed in a pore of the porous matrix, disposed on a surface of the porous matrix, disposed on a surface of the lubricant, disposed in the lubricant, or a combination thereof.

4. The composite of claim 1, wherein the hydrophobic compound comprises a fluoropolymer comprising a repeat unit which comprises vinylidene fluoride, hexafluoropropylene, tetrafluoroethylene, chlorotrifluoroethylene, perfluoro (alkyl vinyl ether), perfluoro(ethyl vinyl ether), perfluoro (propyl vinyl ether), or a combination thereof.

5. The composite of claim 1, wherein Mo is present in the Mo—Si—B alloy in an amount from 70 at % to 98 at %, based on a total atomic amount of Mo, Si, and B;
    Si is present in the Mo—Si—B alloy in an amount from 2 at % to 25 at %, based on a total atomic amount of Mo, Si, and B; and
    B is present in the Mo—Si—B alloy in an amount from 1 at % to 15 at %, based on a total atomic amount of Mo, Si, and B.

6. The composite of claim 1, wherein the Mo—Si—B alloy is present in an amount from 30 wt % to 90 wt %, based on a total weight of the Mo—Si—B alloy, the lubricant, and the hydrophobic compound.

7. The composite of claim 6, wherein the lubricant is present in an amount from 5 wt % to 30 wt %, and the hydrophobic compound is present in an amount from 0 wt % to 70 wt %, based on a total weight of the Mo—Si—B alloy, the lubricant, and the hydrophobic compound.

8. The composite of claim 1, wherein a thickness of the porous matrix (Mo—Si—B) is from 20 μm to 200 μm.

9. The composite of claim 1, wherein the composite is resistant to oxidation at a temperature greater than or equal to 1200° C.

10. The composite of claim 1, wherein the composite is a downhole tool comprising a drill bit, cutter, tubular, slip, cable, housing, or seal.

11. The composite of claim 1, wherein the Mo—Si—B alloy is present in an amount from 40 wt % to 90 wt %, the lubricant is present in an amount from 5 wt % to 30 wt %, the hydrophobic compound is present in an amount of 5 wt % to 30 wt %, each based on a total weight of the Mo—Si—B alloy, the lubricant, and the hydrophobic compound.

12. A method for preparing a porous composite, the method comprising:
    disposing a porous matrix comprising a molybdenum-silicon-boron (Mo—Si—B) alloy on a substrate, the Mo—Si—B alloy comprising a plurality of pores and comprising one or more of the following: α-Mo; $Mo_3Si$; $Mo_5SiB_2$; or Mo-20Si-10B;
    disposing a lubricant on a surface of the porous matrix; and
    disposing a hydrophobic compound on a surface of the porous matrix to form the porous composite;
    wherein the lubricant is a solid lubricant and comprises one or more of the following: indium; tin; antimony; germanium; zinc; copper; boron nitride; graphene; or carbon nanotube; and further wherein an amount of the plurality of pores in the porous matrix is from 5 vol % to 40 vol %, based on a total volume of the porous matrix, and the average pore size is greater than or equal to 1 micron; and
    wherein a strength of the composite is greater than or equal to 500 MPa at a temperature greater than or equal to 1000° C.

13. The method of claim 12, further comprising:
    heating the porous composite;
    flowing the lubricant in the plurality of pores; and
    flowing the hydrophobic compound in the plurality of pores.

14. The process of claim 12, further comprising:
    contacting Mo—$Si_3N_4$ with BN; and
    forming a plurality of grains of the Mo—Si—B alloy;
    heating the plurality of grains; and
    consolidating the plurality of grains by applying pressure to produce a Mo—Si—B alloy compact,
    wherein disposing the porous matrix on the substrate comprises:
        removing a portion of the Mo—Si—B alloy; and
        depositing the Mo—Si—B alloy on the substrate to form the porous matrix.

15. The process of claim 12, further comprising:
    consolidating a powder of the Mo—Si—B alloy; and
    sintering the powder to produce a Mo—Si—B alloy compact,
    wherein disposing the porous matrix on the substrate comprises:
        removing a portion of the Mo—Si—B alloy; and
        depositing the Mo—Si—B alloy on the substrate to form the porous matrix.

16. The method of claim 12, wherein the lubricant is a solid lubricant having a melting temperature greater than or equal to 150° C.

17. The method of claim 12, wherein the hydrophobic compound comprises a fluoropolymer;
    the lubricant comprises a transition metal or post-transition metal; and
    Si and B are present in the Mo—Si—B alloy in an amount respectively from 7 at % to 12 at % of Si and from 9 at % to 14 at % of B, with a balance being Mo, based on the total atomic amount Mo, Si, and B in the Mo—Si—B alloy.

* * * * *